(12) United States Patent
Takemura et al.

(10) Patent No.: US 8,796,384 B2
(45) Date of Patent: Aug. 5, 2014

(54) CROSSLINKABLE FLUORINE RUBBER COMPOSITION, FLUORINE RUBBER MOLDED ARTICLE, AND METHOD FOR PRODUCING THE SAME

(75) Inventors: Kouhei Takemura, Settsu (JP); Tomihiko Yanagiguchi, Settsu (JP)

(73) Assignee: Daikin Industries, Ltd., Osaka (JP)

( * ) Notice: Subject to any disclaimer, the term of this patent is extended or adjusted under 35 U.S.C. 154(b) by 0 days.

(21) Appl. No.: 13/381,585

(22) PCT Filed: Jul. 2, 2010

(86) PCT No.: PCT/JP2010/061326
§ 371 (c)(1),
(2), (4) Date: Dec. 29, 2011

(87) PCT Pub. No.: WO2011/002080
PCT Pub. Date: Jan. 6, 2011

(65) Prior Publication Data
US 2012/0108753 A1 May 3, 2012

(30) Foreign Application Priority Data
Jul. 3, 2009 (JP) .................................. 2009-159071

(51) Int. Cl.
C08L 27/12 (2006.01)
C08F 214/26 (2006.01)
C08G 75/02 (2006.01)

(52) U.S. Cl.
USPC ............................ 525/199; 525/200; 524/520

(58) Field of Classification Search
USPC .................................. 525/199, 200; 524/520
See application file for complete search history.

(56) References Cited

U.S. PATENT DOCUMENTS

| | | | | |
|---|---|---|---|---|
| 4,597,414 A * | 7/1986 | Johnson | | 137/625.25 |
| 4,981,912 A * | 1/1991 | Kurihara | | 525/326.3 |
| 6,310,142 B1 * | 10/2001 | Apostolo et al. | | 525/200 |
| 2009/0011164 A1 | 1/2009 | Masuda et al. | | |
| 2009/0226654 A1 | 9/2009 | Yanagiguchi et al. | | |
| 2010/0247913 A1 | 9/2010 | Nakagawa et al. | | |
| 2011/0086983 A1 | 4/2011 | Yanagiguchi et al. | | |
| 2011/0290363 A1 | 12/2011 | Yanagiguchi et al. | | |
| 2012/0053297 A1 | 3/2012 | Nakagawa et al. | | |

FOREIGN PATENT DOCUMENTS

| | | |
|---|---|---|
| CN | 101065440 A | 10/2007 |
| EP | 1031607 A1 | 8/2000 |
| EP | 1816162 A1 | 8/2007 |
| EP | 1826238 A1 | 8/2007 |
| EP | 2154204 A1 | 2/2010 |
| EP | 2264100 A1 | 12/2010 |
| JP | 50-32244 | 3/1975 |
| JP | 6-25500 A | 2/1994 |
| JP | 7-227935 A | 8/1995 |
| JP | 2000-230096 A | 8/2000 |
| JP | 2000-230096 A | 8/2000 |
| JP | 2000-313089 A | 11/2000 |
| JP | 2001-131346 A | 5/2001 |
| JP | 2001-131346 A | 5/2001 |
| JP | 2002-293831 A | 10/2002 |
| JP | 2003-096438 A | 4/2003 |
| JP | 2003-096438 A | 4/2003 |
| JP | 2006-292160 A | 10/2006 |
| WO | 2008142983 A1 | 11/2008 |
| WO | 2009119409 A1 | 10/2009 |
| WO | 2010063810 A1 | 6/2010 |
| WO | WO 2010/029899 A1 | 8/2010 |

OTHER PUBLICATIONS

Extended European Search Report for counterpart EP Appln. No. 10794248.4 issued on Jan. 30, 2013.

* cited by examiner

Primary Examiner — Nathan M Nutter
(74) Attorney, Agent, or Firm — Sughrue Mion, PLLC

(57) ABSTRACT

Provided is a cross-linkable fluororubber composition capable of giving a fluororubber cross-linked molded article that has excellent mechanical strength and low friction properties. The cross-linkable fluororubber composition includes a coagulum obtained by co-coagulating a fluororubber (A) and a fluororesin (B).

8 Claims, No Drawings

CROSSLINKABLE FLUORINE RUBBER COMPOSITION, FLUORINE RUBBER MOLDED ARTICLE, AND METHOD FOR PRODUCING THE SAME

CROSS REFERENCE TO RELATED APPLICATIONS

This application is a National Stage of International Application No. PCT/JP2010/061326 filed Jul. 2, 2010, claiming priority based on Japanese Patent Application No. 2009-159071, filed Jul. 3, 2009, the contents of all of which are incorporated herein by reference in their entirety.

TECHNICAL FIELD

The present invention relates to a cross-linkable fluororubber composition, a molded article obtained by cross-linking the cross-linkable fluororubber composition, and a method for producing the molded article. These are suitable as various types of sealing materials, slide members, non-adhesive members, and members having water repellency and oil repellency on the surface.

BACKGROUND ART

Fluororubbers have excellent chemical resistance, solvent resistance, and heat resistance, and are widely used in various fields such as automobile industries, semiconductor industries, and chemical industries. In the automobile industries, for example, fluororubbers are used as hoses, sealing materials and the like used for engines and peripheral devices thereof, automatic transmissions, fuel systems and peripheral devices thereof, and the like.

In some cases, however, fluororubbers such as propylene-tetrafluoroethylene copolymer rubbers embrittle at low temperatures. Patent Document 1 suggests a method which solves such a problem by blending an ethylene-tetrafluoroethylene copolymer resin [ETFE] having a melting point of 240° C. to 300° C., melt-kneading the mixture, and irradiation cross-linking or peroxide cross-linking the mixture.

Patent Document 2 also teaches a method of producing a cross-linked rubber having better hot strength by pressure cross-linking a fluororubber composition including a fluororubber (a vinylidene fluoride [VdF] rubber), a fluororesin [ETFE], and a fluorine-containing thermoplastic elastomer (at 160° C. for 10 minutes), and further cross-linking the composition in an oven (at 180° C. for 4 hours).

These Patent Documents do not mention the surface properties, particularly the friction characteristics, of the cross-linked rubber. This is because rubbers naturally have a high coefficient of friction because of the elastomeric properties.

In the fields of sealing materials or other products, suggested methods of reducing the coefficient of friction while taking advantage of the characteristics of rubber include a method of laminating, for example, a fluororesin (or a fluororesin fibrous layer) on the surface of the rubber (Patent Documents 3 and 4), and a method of forming a coating film of a fluororesin on the surface of the rubber (Patent Document 5).

Patent Document 1: JP 50-32244 A
Patent Document 2: JP 6-25500 A
Patent Document 3: JP 7-227935 A
Patent Document 4: JP 2000-313089 A
Patent Document 5: JP 2006-292160 A

SUMMARY OF THE INVENTION

Problems to be Solved by the Invention

In the case of forming a fluororesin layer on the surface of the rubber by lamination or coating, the major aim is to increase the adhesion at the interface between the fluororubber and the fluororesin. The current state of the art techniques, however, have difficulties in achieving such an aim.

The present invention aims to provide a cross-linkable fluororubber composition capable of giving a fluororubber molded article having high mechanical strength and low friction properties, a molded article obtainable by cross-linking the composition, and a method for producing the molded article.

Means for Solving the Problems

The present invention has been completed upon unexpected finding that a fluororubber molded article having high mechanical strength and low coefficient of friction can be produced by cross-linking a cross-linkable fluororubber composition obtained by co-coagulating a fluororubber and a fluororesin, and then heat-treating the composition under specific conditions, differently from the conventional lamination or coating method.

That is, the present invention relates to a cross-linkable fluororubber composition containing a coagulum obtained by co-coagulating a fluororubber (A) and a fluororesin (B).

The fluororesin (B) is preferably at least one selected from the group consisting of ethylene/tetrafluoroethylene copolymers, tetrafluoroethylene/hexafluoropropylene copolymers, tetrafluoroethylene/perfluoro(alkyl vinyl ether) copolymers, tetrafluoroethylene/vinylidene fluoride/hexafluoropropylene copolymers, polyvinylidene fluoride, and chlorotrifluoroethylene/tetrafluoroethylene copolymers.

A mass ratio (A)/(B) of the fluororubber (A) to the fluororesin (B) is preferably 60/40 to 97/3.

The present invention also relates to a fluororubber molded article obtained by cross-linking the cross-linkable fluororubber composition.

The present invention also relates to a method for producing a fluororubber molded article, including (I) a step of obtaining the cross-linkable fluororubber composition by co-coagulating the fluororubber (A) and the fluororesin (B);

(II) a molding and cross-linking step of obtaining a cross-linked molded article by molding and cross-linking the cross-linkable fluororubber composition; and (III) a heat-treatment step of obtaining a fluororubber molded article by heating the cross-linked molded article at a temperature not lower than a melting point of the fluororesin (B).

The present invention also relates to a fluororubber molded article obtained by the above production method.

The fluororubber molded article can be suitably used as a sealing material, a slide member, or a non-adhesive member.

The present invention also relates to a fluororubber molded article having water repellency and oil repellency on a surface.

Effect of the Invention

The present invention can provide a fluororubber molded article having high mechanical strength, low friction properties, non-adhesion, water repellency and oil repellency on a surface. The fluororubber molded article of the present invention is useful as a sealing material, a slide member, a non-adhesive member, or a member having water repellency and oil repellency on the surface.

MODES FOR CARRYING OUT THE INVENTION

The cross-linkable fluororubber composition of the present invention contains a coagulum obtained by co-coagulating a fluororubber (A) and a fluororesin (B).

The cross-linkable fluororubber composition of the present invention, containing the co-coagulated fluororubber (A) and fluororesin (B), is expected to have the fluororubber (A) and the fluororesin (B) uniformly dispersed therein. Hence, cross-linking the cross-linkable fluororubber composition and heat-treating the cross-linked article under specific conditions are considered to give a fluororubber molded article which has low friction properties as well as high mechanical strength.

Examples of the method for the above co-coagulation include (i) a method of mixing an aqueous dispersion of the fluororubber (A) and an aqueous dispersion of the fluororesin (B), and then coagulating the mixture; (ii) a method of mixing the powder of the fluororubber (A) into an aqueous dispersion of the fluororesin (B), and then coagulating the mixture; and (iii) a method of mixing the powder of the fluororesin (B) into an aqueous dispersion of the fluororubber (A), and then coagulating the mixture.

The method (i) is preferable as the co-coagulation method from the viewpoint of particularly uniform dispersion of the resins. Particularly, the fluororubber (A) and the fluororesin (B) are preferably obtained by mixing an aqueous dispersion of the fluororubber (A) and an aqueous dispersion of the fluororesin (B), coagulating the mixture, recovering the coagulum, and optionally drying the coagulum.

(A) Fluororubber

The fluororubber (A) is produced from an amorphous polymer that has fluorine atoms bonded to carbon atoms constituting the main chain, and has rubber elasticity. The fluororubber (A) may be produced from one kind of polymer, or may be produced from two or more kinds of polymers.

Examples of the fluororubber (A) include vinylidene fluoride (VdF)/hexafluoropropylene (HFP) copolymers, VdF/HFP/tetrafluoroethylene (TFE) copolymers, TFE/propylene copolymers, TFE/propylene/VdF copolymers, ethylene/HFP copolymers, ethylene/HFP/VdF copolymers, ethylene/HFP/TFE copolymers, VdF/TFE/perfluoro(alkyl vinyl ether) (PAVE) copolymers, and VdF/CTFE copolymers.

The fluororubber (A) is preferably a copolymer containing a vinylidene fluoride unit, or a tetrafluoroethylene (TFE)/propylene (P) copolymer.

The fluororubber containing a vinylidene fluoride (VdF) unit (hereinafter, such a fluororubber is also referred to as a "VdF fluororubber") is described hereinbelow. The VdF fluororubber is a fluororubber at least containing a copolymerization unit derived from vinylidene fluoride.

The copolymer containing a VdF unit is preferably a copolymer containing a VdF unit and a copolymerization unit (excluding the VdF unit) derived from a fluorine-containing ethylenic monomer. The copolymer containing a VdF unit preferably further contains a copolymerization unit derived from a monomer copolymerizable with VdF and a fluorine-containing ethylenic monomer.

The copolymer containing a VdF unit preferably contains 30 to 85 mol % of the VdF unit and 70 to 15 mol % of the copolymerization unit derived from a fluorine-containing ethylenic monomer, and more preferably contains 30 to 80 mol % of the VdF unit and 70 to 20 mol % of the copolymerization unit derived from a fluorine-containing ethylenic monomer. The copolymerization unit derived from a monomer copolymerizable with VdF and a fluorine-containing ethylenic monomer preferably constitutes 0 to 10 mol % of the total amount of the VdF unit and the copolymerization unit derived from a fluorine-containing ethylenic monomer.

Examples of the fluorine-containing ethylenic monomer include fluorine-containing monomers such as TFE, CTFE, trifluoroethylene, HFP, trifluoropropylene, tetrafluoropropylene, pentafluoropropylene, trifluorobutene, tetrafluoroisobutene, perfluoro(alkyl vinyl ether) (hereinafter, also referred to as PAVE), and vinyl fluoride. Among these, at least one selected from the group consisting of TFE, HFP, and PAVE is preferable.

The PAVE is preferably at least one selected from the group consisting of compounds represented by formula (1):

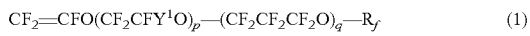

(wherein $Y^1$ represents F or $CF_3$, $R_f$ represents a C1 to C5 perfluoroalkyl group, p represents an integer of 0 to 5, and q represents an integer of 0 to 5), and compounds represented by formula (2):

(wherein X represents H, F, or $CF_2$, and $R^1$ represents a straight chain or branched $C_1$ to $C_6$ fluoroalkyl group or a $C_5$ or $C_6$ cyclic fluoroalkyl group).

$R^1$ in formula (2) may be a fluoroalkyl group containing one or two atoms selected from the group consisting of H, Cl, Br, and I.

The PAVE is preferably perfluoro(methyl vinyl ether) or perfluoro(propyl vinyl ether), and is more preferably perfluoro(methyl vinyl ether). Each of these may be used alone or in any combination.

Examples of the monomer copolymerizable with VdF and a fluorine-containing ethylenic monomer include ethylene, propylene, and alkyl vinyl ether.

Specific preferable examples of such a copolymer containing a VdF unit include one or two or more copolymers such as VdF/HFP copolymers, VdF/HFP/TFE copolymers, VdF/CTFE copolymers, VdF/CTFE/TFE copolymers, VdF/PAVE copolymers, VdF/TFE/PAVE copolymers, VdF/HFP/PAVE copolymers, and VdF/HFP/TFE/PAVE copolymers. Among these copolymers containing a VdF unit, VdF/HFP copolymers and VdF/HFP/TFE copolymers are particularly preferable from the viewpoints of heat resistance, compression set, processability, and cost.

The VdF/HFP copolymer preferably has a molar ratio VdF/HFP of 45 to 85/55 to 15, more preferably 50 to 80/50 to 20, and still more preferably 60 to 80/40 to 20.

The VdF/HFP/TFE copolymer preferably has a molar ratio VdF/HFP/TFE of 40 to 80/10 to 35/10 to 35.

The VdF/PAVE copolymer preferably has a molar ratio VdF/PAVE of 65 to 90/10 to 35.

The VdF/TFE/PAVE copolymer preferably has a molar ratio VdF/TFE/PAVE of 40 to 80/3 to 40/15 to 35.

The VdF/HFP/PAVE copolymer preferably has a molar ratio VdF/HFP/PAVE of 65 to 90/3 to 25/3 to 25.

The VdF/HFP/TFE/PAVE copolymer preferably has a molar ratio VdF/HFP/TFE/PAVE of 40 to 90/0 to 25/0 to 40/3 to 35, and more preferably 40 to 80/3 to 25/3 to 40/3 to 25.

The fluororubber (A) is alternatively preferably a TFE/P copolymer. The TFE/P copolymer preferably contains a tetrafluoroethylene unit, a propylene unit, and a repeating unit derived from another monomer as an optional component copolymerizable with tetrafluoroethylene and propylene. More preferably, the TFE/P copolymer contains 90 to 100 mol % of the tetrafluoroethylene unit and the propylene unit in total, and 10 to 0 mol % of the repeating unit derived from another monomer.

Here, another monomer is not particularly limited as long as it is a monomer copolymerizable with the tetrafluoroethylene unit and the propylene unit, and is preferably vinylidene fluoride (VdF).

The fluororubber (A) is also alternatively preferably a copolymer containing a copolymerization unit derived from a cross-linking-site-imparting monomer. Examples of the cross-linking-site-imparting monomer include iodine-containing monomers such as perfluoro(6,6-dihydro-6-iodo-3-oxa-1-hexene) and perfluoro(5-iodo-3-oxa-1-pentene) described in JP 5-63482 B and JP 7-316234 A, bromine-containing monomers described in JP 4-505341 A, cyano group-containing monomers, carboxyl group-containing monomers, and alkoxycarbonyl group-containing monomers described in JP 4-505345 A and JP 5-500070 A. Among these cross-linking-site-imparting monomers, cyano group-containing monomers are preferable.

Examples of the cyano group-containing monomer include cyano group-containing monomers represented by the following formulas (3) to (20), and each of these may be used alone or in any combination.

$$CY^2{}_2=CY^2(CF_2)_n-CN \quad (3)$$

(wherein $Y^2$ is a hydrogen atom or a fluorine atom, and n is an integer of 1 to 8)

$$CF_2=CFCF_2R_f{}^1-CN \quad (4)$$

(wherein $R_f{}^1$ is $-(OCF_2)_n-$ or $-(OCF(CF_3))_n-$, and n is an integer of 0 to 5)

$$CF_2=CFCF_2(OCF(CF_3)CF_2)_m(OCH_2CF_2CF_2)_nOCH_2OF_2-CN \quad (5)$$

(wherein m is an integer of 0 to 5 and n is an integer of 0 to 5)

$$CF_2=CFCF_2(OCH_2CF_2CF_2)_m(OCF(CF_3)CF_2)_nOCF(CF_3)-CN \quad (6)$$

(wherein m is an integer of 0 to 5 and n is an integer of 0 to 5)

$$CF_2=CF(OCF_2CF(CF_3))_mO(CF_2)_n-CN \quad (7)$$

(wherein m is an integer of 0 to 5 and n is an integer of 1 to 8)

$$CF_2=CF(OCF_2CF(CF_3))_m-CN \quad (8)$$

(wherein m is an integer of 1 to 5)

$$CF_2=CFOCF_2(CF(CF_3)OCF_2)_nCF(-CN)CF_3 \quad (9)$$

(wherein n is an integer of 1 to 4)

$$CF_2=CFO(CF_2)_nOCF(CF_3)-CN \quad (10)$$

(wherein n is an integer of 2 to 5)

$$CF_2=CFO(CF_2)_n-(C_6H_4)-CN \quad (11)$$

(wherein n is an integer of 1 to 6)

$$CF_2=CF(OCF_2CF(CF_3))_nOCF_2CF(CF_3)-CN \quad (12)$$

(wherein n is an integer of 1 or 2)

$$CH_2=CFCF_2O(CF(CF_3)CF_2O)_nCF(CF_3)-CN \quad (13)$$

(wherein n is an integer of 0 to 5)

$$CF_2=CFO(CF_2CF(CF_3)O)_m(CF_2)_n-CN \quad (14)$$

(wherein m is an integer of 0 to 5 and n is an integer of 1 to 3)

$$CH_2=CFCF_2OCF(CF_3)OCF(CF_3) \quad (15)$$

$$CH_2=CFCF_2OCH_2CF_2-CN \quad (16)$$

$$CF_2=CFO(CF_2CF(CF_3)O)_mCF_2CF(CF_3)-CN \quad (17)$$

(wherein m is an integer not smaller than 0)

$$CF_2=CFOCF(CF_3)CF_2O(CF_2)_n-CN \quad (18)$$

(wherein n is an integer not smaller than 1)

$$CF_2=CFOCF_2OCF_2CF(CF_3)OCF_2-CN \quad (19)$$

$$CF_2=CFOCF(CF_3)CF_2OCF_2CF_2-CN \quad (20)$$

Among these, the cyano group-containing monomer represented by formula (7), (14), or (20) is preferable from the viewpoints of copolymerization properties and vulcanization properties, and $CF_2=CFOCF_2CF(CF_3)OCF_2CF_2CN$, $CF_2=CFO(CF_2)_5CN$, or $CF_2=CFOCF(CF_3)CF_2OCF_2CF_2-CN$ is more preferable.

In the case that the fluororubber (A) contains a copolymerization unit derived from the cyano group-containing monomer, the cyano group is cyclotrimerized and thus triazine cross-linking is allowed to proceed.

The copolymerization unit derived from a cyano group-containing monomer constitutes preferably 0.1 to 5 mol %, and more preferably 0.3 to 3 mol % of the total amount of the VdF unit and the copolymerization unit derived from a fluorine-containing ethylenic monomer, from the viewpoints of good cross-linking characteristics and good heat resistance.

The fluororubber (A) is also preferably one having an iodine atom or a bromine atom at an end of the main chain thereof. A fluororubber having an iodine atom or a bromine atom at an end of the main chain thereof can be produced by triggering emulsion polymerization of monomers with a radical initiator in an aqueous medium in the presence of a halogen compound and in the substantial absence of oxygen.

A typical compound used as the halogen compound may be, for example, a compound represented by the following formula:

$$R^2I_xBr_y$$

(wherein x and y each are an integer of 0 to 2 and satisfy $1 \leq x+y \leq 2$; and $R^2$ is a saturated or unsaturated C1 to C16 fluorohydrocarbon or chlorofluoro hydrocarbon group, or a C1 to C3 hydrocarbon group, and may contain an oxygen atom).

Examples of the halogen compound include 1,3-diiodoperfluoropropane, 1,3-diiodo-2-chloroperfluoropropane, 1,4-diiodoperfluorobutane, 1,5-diiodo-2,4-dichloroperfluoropentane, 1,6-diiodoperfluorohexane, 1,8-diiodoperfluorooctane, 1,12-diiodoperfluorododecane, 1,16-diiodoperfluorohexadecane, diiodomethane, 1,2-diiodoethane, 1,3-diiodo-n-propane, $CF_2Br_2$, $BrCF_2CF_2Br$, $CF_3CFBrCF_2Br$, $CFClBr_2$, $BrCF_2CFClBr$, $CFBrClCFClBr$, $BrCF_2CF_2CF_2Br$, $BrCF_2CFBrOCF_3$, 1-bromo-2-iodo perfluoroethane, 1-bromo-3-iodoperfluoropropane, 1-bromo-4-iodoperfluorobutane, 2-bromo-3-iodoperfluorobutane, 3-bromo-4-iodoperfluorobutene-1, 2-bromo-4-iodoperfluorobutene-1, monoiodomonobromo-substituted benzene, diiodomonobromo-substituted benzene, and (2-iodoethyl)- and (2-bromoethyl)-substituted benzene. Each of these compounds may be used alone or in any combination.

Among these, 1,4-diiodoperfluorobutane or diiodomethane are preferable from the viewpoints of polymerization reactivity, cross-linking reactivity, and easy availability.

The fluororubber (A) preferably has a Mooney viscosity ($ML_{1+10}(121^\circ C.)$) of 5 to 140, more preferably 10 to 120, and still more preferably 20 to 100, from the viewpoint of good processability.

The fluororubber (A) preferably has a number average molecular weight of 20,000 to 1,200,000, more preferably 30,000 to 300,000, and still more preferably 50,000 to 200,000.

The fluororubber (A) used in the present invention is preferably a fluororubber having a fluorine content of not lower than 50% by mass, more preferably a fluororubber having a fluorine content of not lower than 60% by mass, and still more preferably a fluororubber having a fluorine content of not lower than 65% by mass. The maximum fluorine content is not particularly limited, and is preferably not higher than 74% by mass. Too low a fluorine content tends to bring inferior chemical resistance, inferior fuel resistance, and inferior low fuel penetrability.

The cross-link system for the fluororubber (A) can be selected according to the application. Examples of the cross-linking system include peroxide cross-linking systems, polyol cross-linking systems, polyamine cross-linking systems, oxazole cross-linking systems, imidazole cross-linking systems, thiazole cross-linking systems, triazine cross-linking systems, and irradiation cross-linking systems. The cross-linkable fluororubber composition of the present invention may contain a cross-linking agent or ammonia-producing compound used in each cross-linking system.

The peroxide cross-linking can be performed when a peroxide-cross-linkable fluororubber and an organic peroxide as the cross-linking agent are used.

The peroxide-cross-linkable fluororubber is not particularly limited, and any fluororubber having a peroxide-cross-linkable moiety may be used. The peroxide-cross-linkable moiety is not particularly limited, and examples thereof include moieties containing a propylene (P) unit, moieties containing iodine atoms, and moieties containing bromine atoms.

The organic peroxide may be any organic peroxide, provided that it can generate peroxy radicals easily in the presence of heat or a redox system. Examples thereof include 1,1-bis(t-butylperoxy)-3,5,5-trimethylcyclohexane, 2,5-dimethylhexane-2,5-dihydroperoxide, di-t-butyl peroxide, t-butylcumyl peroxide, dicumyl peroxide, α,α-bis(t-butylperoxy)-p-diisopropylbenzene, 2,5-dimethyl-2,5-di(t-butylperoxy)hexane, 2,5-dimethyl-2,5-di(t-butylperoxy)-hexyne-3, benzoyl peroxide, t-butylperoxybenzene, t-butylperoxy maleic acid, t-butylperoxyisopropyl carbonate, and t-butylperoxybenzoate. Among these, 2,5-dimethyl-2,5-di(t-butylperoxy)hexane and 2,5-dimethyl-2,5-di(t-butylperoxy)-hexyne-3 are preferable.

In the case that the cross-linking agent is an organic peroxide, the cross-linkable fluororubber composition of the present invention preferably contains a cross-linking aid. Examples of the cross-linking aid include triallyl cyanurate, triallyl isocyanurate (TAIC), triacrylformal, triallyl trimellitate, N,N'-m-phenylene bismaleimide, dipropargyl terephthalate, diallyl phthalate, tetraallyl terephthalate amide, triallyl phosphate, bismaleimide, fluorinated triallyl isocyanurate (1,3,5-tris(2,3,3-trifluoro-2-propenyl)-1,3,5-triazine-2,4,6-trione), tris(diallylamine)-S-triazine, triallyl phosphite, N,N-diallylacrylamide, 1,6-divinyl dodecafluorohexane, hexaallyl phosphoramide, N,N,N',N'-tetraallylphthalamide, N,N,N',N'-tetraallylmalonamide, trivinyl isocyanurate, 2,4,6-trivinyl methyltrisiloxane, tri(5-norbornene-2-methylene) cyanurate, and triallyl phosphite. Among these, triallyl isocyanurate (TAIC) is preferable from the viewpoints of the good cross-linkability and the good physical properties of the molded article.

The amount of the cross-linking aid is 0.01 to 10 parts by mass, and preferably 0.1 to 5.0 parts by mass, relative to 100 parts by mass of the fluororubber. If the amount of the cross-linking aid is less than 0.01 parts by mass, the cross-linking time tends to be impractically long. If the amount of the cross-linking aid is more than 10 parts by mass, the cross-linking time may be too short, and the compression set of the molded article tends to decrease.

The polyol cross-linking can be performed when a polyol-cross-linkable fluororubber and a polyhydroxy compound as the cross-linking agent are used.

The polyol-cross-linkable fluororubber is not particularly limited, and any fluororubber having a polyol-cross-linkable moiety may be used. The polyol-cross-linkable moiety is not particularly limited, and examples thereof include moieties having a vinylidene fluoride (VdF) unit. Examples of the method of introducing the cross-linkable moiety include a method of copolymerizing cross-linking-site-imparting monomers when the fluororubber is polymerized.

As a polyhydroxy compound, a polyhydroxy aromatic compound is suitably used from the viewpoint of excellent heat resistance.

The polyhydroxy aromatic compound is not particularly limited, and examples thereof include 2,2-bis(4-hydroxyphenyl)propane (hereinafter referred to as bisphenol A), 2,2-bis(4-hydroxyphenyl)perfluoropropane (hereinafter referred to as bisphenol AF), resorcin, 1,3-dihydroxybenzene, 1,7-dihydroxynaphthalene, 2,7-dihydroxynaphthalene, 1,6-dihydroxynaphthalene, 4,4'-dihydroxydiphenyl, 4,4'-dihydroxystilbene, 2,6-dihydroxyanthracene, hydroquinone, catechol, 2,2-bis(4-hydroxyphenyl)butane (hereinafter referred to as bisphenol B), 4,4-bis(4-hydroxyphenyl)valeric acid, 2,2-bis(4-hydroxyphenyl)tetrafluorodichloropropane, 4,4'-dihydroxydiphenylsulfone, 4,4'-dihydroxydiphenyl ketone, tri(4-hydroxyphenyl)methane, 3,3',5,5'-tetrachlorobisphenol A, and 3,3',5,5'-tetrabromobisphenol A. These polyhydroxy aromatic compounds may be metal salts such as alkali metal salts and alkaline earth metal salts, but these metal salts are preferably not used in the case of coagulating the copolymer with use of an acid.

In the case that the cross-linking agent is a polyhydroxy compound, the cross-linkable fluororubber composition of the present invention preferably contains a cross-linking accelerator. A cross-linking accelerator promotes generation of double bonds in molecules in dehydrofluorination reaction of the main chain of the polymer, and addition of the polyhydroxy compound to the generated double bonds.

Examples of the cross-linking accelerator include onium compounds. Preferable among the onium compounds is at least one selected from the group consisting of ammonium compounds such as a quaternary ammonium salt, phosphonium compounds such as a quaternary phosphonium salt, oxonium compounds, sulfonium compounds, cyclic amines, and monofunctional amine compounds. Among these, at least one selected from the group consisting of quaternary ammonium salts and quaternary phosphonium salts is more preferable.

The quaternary ammonium salts are not particularly limited, and examples thereof include 8-methyl-1,8-diazabicyclo[5,4,0]-7-undecenium chloride, 8-methyl-1,8-diazabicyclo[5,4,0]-7-undecenium iodide, 8-methyl-1,8-diazabicyclo[5,4,0]-7-undecenium hydroxide, 8-methyl-1,8-diazabicyclo[5,4,0]-7-undecenium methyl sulfate, 8-ethyl-1,8-dizazbicyclo[5,4,0]-7-undecenium bromide, 8-propyl-1,8-diazabicyclo[5,4,0]-7-undecenium bromide, 8-dodecyl-1,8-diazabicyclo[5,4,0]-7-undecenium chloride, 8-dodecyl-1,8-diazabicyclo[5,4,0]-7-undecenium hydroxide, 8-eicosyl-1,8-diazabicyclo[5,4,0]-7-undecenium chloride, 8-tetracosyl-1,8-diazabicyclo[5,4,0]-7-undecenium chloride, 8-benzyl-1,8-diazabicyclo[5,4,0]-7-undecenium chloride (hereinafter referred to as DBU-B), 8-benzyl-1,8-diazabicyclo[5,4,0]-7-undecenium hydroxide, 8-phenethyl-1,8-diazabicyclo[5,4,0]-7-undecenium chloride, and 8-(3-phenylpropyl)-1,8-diazabicyclo[5,4,0]-7-undecenium chloride. Among these, DBU-B is preferable from the viewpoints of excellent cross-linkability and excellent physical properties of the molded article.

The quaternary phosphonium salts are not particularly limited. Examples thereof include tetrabutylphosphonium chloride, benzyltriphenylphosphonium chloride (hereinafter referred to as BTPPC), benzyltrimethylphosphonium chloride, benzyltributylphosphonium chloride, tributylallylphosphonium chloride, tributyl-2-methoxypropylphosphonium chloride, and benzylphenyl(dimethylamino)phosphonium chloride. Preferable among these is benzyltriphenylphosphonium chloride (BTPPC) from the viewpoints of the excellent cross-linkability and the excellent physical properties of the molded article.

The cross-linking accelerator may be a solid solution of a quaternary ammonium salt and bisphenol AF, a solid solution of a quaternary phosphonium salt and bisphenol AF, or a chlorine-free cross-linking accelerator disclosed in JP 11-147891 A.

The amount of the cross-linking accelerator is preferably 0.01 to 8 parts by mass, and more preferably 0.02 to 5 parts by mass, relative to 100 parts by mass of the fluororubber. If the amount of the cross-linking accelerator is less than 0.01 parts by mass, cross-linking of the fluororubber tends not to proceed sufficiently, resulting in a decrease in the heat resistance and oil resistance of the molded article to be obtained. If the amount of the cross-linking accelerator is more than 8 parts by mass, molding processability of the cross-linkable fluororubber composition tends to decrease.

The polyamine cross-linking can be performed when a polyamine-cross-linkable fluororubber and a polyamine compound as the cross-linking agent are used.

The polyamine-cross-linkable fluororubber is not particularly limited, and any fluororubber having a polyamine-cross-linkable moiety may be used. The polyamine-cross-linkable moiety is not particularly limited, and examples thereof include moieties having a vinylidene fluoride (VdF) unit. Examples of the method of introducing the cross-linkable moiety include a method of copolymerizing cross-linking-site-imparting monomers in polymerization of the fluororubber.

Examples of the polyamine compound include hexamethylenediamine carbamate, N,N'-dicinnamylidene-1,6-hexamethylenediamine, and 4,4'-bis(aminocyclohexyl)methane carbamate. Among these, N,N'-dicinnamylidene-1,6-hexamethylenediamine is preferable.

Each of the triazine cross-linking, oxazole cross-linking, imidazole cross-linking, and thiazole cross-linking can be performed using a fluororubber cross-linkable in the cross-linking system together with an oxazole cross-linking agent, imidazole cross-linking agent, thiazole cross-linking agent, or triazine cross-linking agent.

Examples of the fluororubbers cross-linkable by these cross-linking systems include copolymers having copolymerization units derived from the above cross-linking-site-imparting monomers.

Examples of the oxazole cross-linking agent, the imidazole cross-linking agent, the thiazole cross-linking agent, and the triazine cross-linking agent include compounds including at least two cross-linkable reactive groups represented by the following formula:

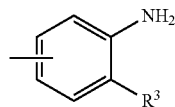

(wherein $R^3$s are the same as or different from each other, each $R^3$ is $-NH_2$, $-NHR^4$, $-OH$, or $-SH$, and $R^4$ is a fluorine atom or a monovalent organic group);

compounds represented by the following formula:

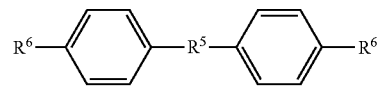

(wherein $R^5$ is $-SO_2-$, $-O-$, $-CO-$, a C1 to C6 alkylene group, a C1 to C10 perfluoroalkylene group, or a single bond, and $R^6$ is either one of the following groups);

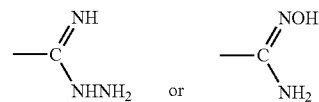

compounds represented by the following formula:

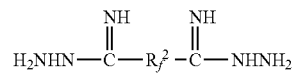

(wherein $R_f^2$ is a C1 to C10 perfluoroalkylene group); and compounds represented by the following formula:

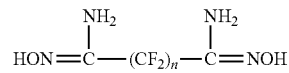

(wherein n is an integer of 1 to 10).

Non-limiting specific examples thereof include 2,2-bis(3,4-diaminophenyl)hexafluoropropane, 2,2-bis[3-amino-4-(N-methylamino)phenyl]hexafluoropropane, 2,2-bis[3-amino-4-(N-ethylamino)phenyl]hexafluoropropane, 2,2-bis[3-amino-4-(N-propylamino)phenyl]hexafluoropropane, 2,2-bis[3-amino-4-(N-phenylamino)phenyl]hexafluoropropane, 2,2-bis[3-amino-4-(N-perfluorophenylamino)phenyl] hexafluoropropane, and 2,2-bis[3-amino-4-(N-benzylamino) phenyl]hexafluoropropane. Among these, 2,2-bis(3,4-diaminophenyl)hexafluoropropane and 2,2-bis[3-amino-4-(N-phenylamino)phenyl]hexafluoropropane are more preferable from the viewpoints of excellent heat resistance and particularly good cross-linking reactivity.

A catalyst for triazine cross-linking can also be used with the above cross-linking agent. Examples of the catalyst for triazine cross-linking include organotin compounds such as tetraphenyltin and triphenyltin. The catalyst for triazine cross-linking may be used alone without being combined with a cross-linking agent.

In the case that the fluororubber (A) is a copolymer containing a copolymerization units derived from cyano group-containing monomers imparting a cross-linking site, use of an ammonia-producing compound causes the cyano groups to be cyclotrimerized and thus allows the triazine cross-linking to proceed. The ammonia-producing compound may be used alone or in combination with an oxazole cross-linking agent, imidazole cross-linking agent, thiazole cross-linking agent, or triazine cross-linking agent. The above ammonia-producing compound is a compound that generates ammonia at 40° C. to 330° C.

Preferable examples of the ammonia-producing compound include urea and ammonium salts. The ammonium salt may be either an organic ammonium salt or inorganic ammonium salt.

The urea may be urea or a urea derivative such as biurea, thiourea, urea hydrochlorides, and biuret.

Examples of the organic ammonium salt include compounds disclosed in JP 9-111081 A, WO 00/09603, and WO 98/23675, such as ammonium salts of polyfluorocarboxylic acids including ammonium perfluorohexanoate, ammonium perfluorooctanoate, ammonium perfluorobutyrate, ammonium perfluoroacetylate, ammonium perfluorododecanate, and ammonium perfluorohexadecanoate; ammonium salts of polyfluorosulfonic acids including ammonium perfluorohexanesulfonate, ammonium perfluorooctanesulfonate, ammonium perfluorododecanesulfonate, and ammonium perfluorohexadecanesulfonate; ammonium salts of polyfluoroalkyl group-containing phosphoric acids and phosphonic acids, including ammonium perfluorohexanephosphate, ammonium perfluorooctanephosphate, ammonium perfluorohexanephosphonate, ammonium perfluorooctanephosphonate, and ammonium perfluorooctanesulfonate; and ammonium salts of non-fluorocarboxylic acids and non-fluorosulfonic acids, including ammonium benzoate and ammonium adipate. Among these, ammonium salts of fluorocarboxylic acids, fluorosulfonic acids, and fluorophosphoric acids are preferable from the viewpoint of dispersibility in the fluororubber, and ammonium salts of non-fluorocarboxylic acids, non-fluorosulfonic acids, and non-fluorophosphoric acids are preferable from the viewpoint of low cost.

Examples of the inorganic ammonium salt include compounds disclosed in JP 9-111081 A, such as ammonium sulfate, ammonium carbonate, ammonium nitrate, and ammonium phosphate. Preferable among these is ammonium phosphate from the viewpoint of vulcanization characteristics.

In addition, acetaldehyde ammonia, hexamethylenetetramine, formamidine, formamidine hydrochloride, formamidine acetate, t-butylcarbamate, benzylcarbamate, $HCF_2CF_2CH(CH_3)OCONH_2$, and phthalamide can be used.

Each of these ammonia-producing compounds may be used alone, or two or more of these may be used in combination.

The amount of the ammonia-producing compound may be appropriately adjusted depending on the amount of ammonia to be produced. In general, the amount thereof is preferably 0.05 to 10 parts by mass, more preferably 0.1 to 5 parts by mass, and still more preferably 0.2 to 3 parts by mass, relative to 100 parts by mass of the fluororubber. Too small an amount of the ammonia-producing compound tends to cause a low cross-linking density, so that the heat resistance and chemical resistance tend to be insufficient for practical use. In contrast, too large an amount thereof may cause scorch, so that the storage stability tends to be poor and the color of the molded article tends not to be clear.

The above irradiation cross-linking system is a cross-linking system in which cross-linking starts upon radiation of active energy rays such as ultraviolet rays and radiation rays. In this case, a cross-linking aid such as a polyfunctional unsaturated compound may be used. The above irradiation cross-linking system is suitable in the case that the fluororubber is a TFE/P copolymer.

Examples of the polyfunctional unsaturated compound include polyfunctional compounds having an ethylenic unsaturated linking group such as $CH_2=CH-$, $CH_2=CHCH_2-$, $CF_2=CF-$, and $-CH=CH-$. Particularly, oxime nitroso compounds, di(meth)acrylate compounds, triester compounds, triallyl isocyanurate compounds, and polybutadiene compounds are preferable from the viewpoint of high cross-linking efficiency. Each of these may be used alone or two or more of these may be used in combination.

Examples of the oxime nitroso compound include dinitroso benzene. Examples of the di(meth)acrylate compound include NK Ester 9G (product of Shin-Nakamura Chemical Co., Ltd.). Examples of the triester compound include Hi-Cross M (product of Seiko Chemical Co., Ltd.) and NK Ester TMTP (product of Shin-Nakamura Chemical Co., Ltd.). Examples of the triallyl isocyanurate compound include triallyl isocyanurate (TAIC) and trimethallyl isocyanurate (TMAIC). Examples of the polybutadiene compound include NISSO-PB (product of Nippon Soda Co., Ltd.). Among these, triallyl isocyanurate (TAIC) is suitable from the viewpoint of high cross-linking efficiency.

The addition amount (blending amount) of the polyfunctional unsaturated compound is preferably 0.1 to 20 parts by mass relative to 100 parts by mass of the fluororubber. Such an amount leads to a further increase in the cross-linking efficiency. The lower limit is more preferably 0.5 parts by mass, and still more preferably 1 part by mass, while the upper limit is more preferably 10 parts by mass and still more preferably 5 parts by mass.

(B) Fluororesin

The fluororesin (B) is preferably a fluorine-containing ethylenic polymer containing a structural unit derived from at least one fluorine-containing ethylenic monomer, and also preferably a melt-processable fluororesin. Examples of the fluorine-containing ethylenic monomer include one or two or more perfluoroolefins such as tetrafluoroethylene [TFE] and a perfluoroethylenic unsaturated compound represented by formula (21):

$$CF_2=CF-R_f^3 \quad (21)$$

(wherein $R_f^3$ represents $-CF_3$ or $-OR_f^4$, and $R_f^4$ represents a C1 to C5 perfluoroalkyl group); chlorotrifluoroethylene [CTFE], trifluoroethylene, hexafluoroisobutene, vinylidene fluoride [VdF], vinyl fluoride, and fluoroolefins represented by formula (22):

$$CH_2=CX^2(CF_2)_nX^3 \quad (22)$$

(wherein $X^2$ represents a hydrogen atom or a fluorine atom, $X^3$ represents a hydrogen atom, a fluorine atom, or a chlorine atom, and n represents an integer of 1 to 10).

The fluororesin (B) may be a fluorine-containing ethylenic polymer having a structural unit derived from a monomer copolymerizable with the above fluorine-containing ethylenic monomer. Examples of such a monomer include non-fluorinated ethylenic monomers other than the above perfluoroolefin and fluoroolefin. Examples of the non-fluorinated ethylenic monomer include ethylene, propylene, and alkyl vinyl ethers. Here, the alkyl vinyl ether refers to an alkyl vinyl ether having a C1 to C5 alkyl group.

Among these, the following fluoropolymers are preferable from the viewpoint of a good effect of reducing the coefficient of friction of the fluororubber molded articles.
(1) Ethylene/TFE copolymer [ETFE]
(2) Copolymer of TFE and one or two or more perfluoroethylenic unsaturated compounds represented by formula (21):

$$CF_2=CF-R_f^3 \quad (21)$$

(wherein $R_f^3$ represents $-CF_3$ or $-OR_f^4$, and $R_f^4$ represents a C1 to C5 perfluoroalkyl group), such as TFE/perfluoro (alkyl vinyl ether) [PAVE] copolymer [PFA] or TFE/hexafluoropropylene [HFP] copolymer [FEP]

(3) Copolymer of TFE, VdF, and one or two or more perfluoroethylenic unsaturated compounds represented by formula (21):

$$CF_2=CF-R_f^3 \quad (21)$$

(wherein $R_f^3$ represents —$CF_3$ or —$OR_f^4$, and $R_f^4$ represents a C1 to C5 perfluoroalkyl group), such as a TFE/VdF/HFP copolymer
(4) Polyvinylidene fluoride [PVdF]
(5) CTFE/TFE copolymer The fluororesin is more preferably at least one selected from the group consisting of ETFE, FEP, PFA, a TFE/VdF/HFP copolymer, PVdF, and a CTFE/TFE copolymer, still more preferably at least one selected from the group consisting of ETFE, FEP, PFA, and a CTFE/TFE copolymer, particularly preferably at least one selected from the group consisting of ETFE, FEP, and a CTFE/TFE copolymer, and most preferably FEP from the viewpoint of particularly excellent compatibility with the fluororubber (A).

ETFE

ETFE is preferable from the viewpoint of an increase in the mechanical properties and fuel barrier properties of the fluororubber molded articles. The molar ratio of the TFE unit to the ethylene unit is preferably 20:80 to 90:10, more preferably 37:63 to 85:15, and particularly preferably 38:62 to 80:20.

ETFE may be a copolymer of TFE, ethylene, and a monomer copolymerizable with TFE and ethylene. Examples of the copolymerizable monomer include monomers represented by the following formulas $CH_2=CX^4R_f^5$, $CF_2=CFR_f^5$, $CF_2=CFOR_f^5$, and $CH_2=C(R_f^5)_2$ (wherein $X^4$ represents a hydrogen atom or a fluorine atom, and $R_f^5$ represents a fluoroalkyl group which may contain an ether-bind-forming oxygen atom). Among these, fluorine-containing vinyl monomers represented by $CH_2=CX^4R_f^5$ are preferable, and fluorine-containing vinyl monomers represented by $CH_2=CX^4R_f^5$ in which $R_f^5$ is a C1 to C8 fluoroalkyl group are more preferable.

Specific examples of the fluorine-containing vinyl monomer represented by the above formulas include 1,1-dihydroperfluoropropene-1,1,1-dihydroperfluorobutene-1,1,1,5-trihydroperfluoropentene-1,1,1,7-trihydroperfluoroheptene-1, 1,1,2-trihydroperfluorohexene-1,1,1,2-trihydroperfluorooctene-1,2,2,3,3,4,4,5,5-octafluoropentyl vinyl ether, perfluoro(methyl vinyl ether), perfluoro(propylvinyl ether), hexafluoropropene, perfluorobutene-1,3,3,3-trifluoro-2-(trifluoromethyl)propene-1, and 2,3,3,4,4,5,5-heptafluoro-1-pentene ($CH_2=CFCF_2CF_2CF_2H$).

The monomer copolymerizable with TFE and ethylene may be an aliphatic unsaturated carboxylic acid such as itaconic acid and itaconic acid anhydride.

The amount of the monomer copolymerizable with TFE and ethylene is preferably 0.1 to 10 mol %, more preferably 0.1 to 5 mol %, and particularly preferably 0.2 to 4 mol % of the amount of the fluorine-containing ethylenic polymer.

FEP

FEP is preferable from the viewpoint of particularly excellent heat resistance and excellent fuel barrier properties of the fluororubber molded article. FEP is not particularly limited, and is preferably a copolymer of 70 to 99 mol % of the TFE unit and 1 to 30 mol % of the HFP unit, and more preferably a copolymer of 80 to 97 mol % of the TFE unit and 3 to 20 mol % of the HFP unit. If the amount of the TFE unit is less than 70 mol %, the mechanical properties tend to decrease. If the amount thereof is more than 99 mol %, the melting point increases too high and thus the moldability tends to decrease.

FEP may be a copolymer of TFE, HFP and a monomer copolymerizable with TFE and HFP. Examples of the monomer include perfluoro(alkyl vinyl ether) [PAVE] represented by $CF_2=CF-OR_f^6$ (wherein $R_f^6$ represents a C1 to C5 perfluoroalkyl group), vinyl monomers represented by $CX^8X^6=CX^7(CF_2)_nX^8$ (wherein $X^5, X^6$, and $X^7$ are the same as or different from each other and each of these is a hydrogen atom or a fluorine atom, $X^8$ represents a hydrogen atom, a fluorine atom, or a chlorine atom, and n represents an integer of 2 to 10), and alkyl perfluorovinyl ether derivatives represented by $CF_2=CF-OCH_2-Rf^7$ (wherein $Rf^7$ represents a C1 to C5 perfluoroalkyl group). Among these, PAVE is preferable.

The PAVE is preferably at least one selected from the group consisting of perfluoro(methyl vinyl ether) [PMVE], perfluoro(ethyl vinyl ether) [PEVE], perfluoro(propyl vinyl ether) [PPVE], and perfluoro(butyl vinyl ether), and is more preferably at least one selected from the group consisting of PMVE, PEVE, and PPVE.

The alkyl perfluorovinyl ether derivative is preferably one in which $Rf^7$ is a C1 to C3 perfluoroalkyl group, and more preferably $CF_2=CF-OCH_2-CF_2CF_3$.

FEP preferably has 0.1 to 10 mol % of the monomer unit derived from a monomer copolymerizable with TFE and HFP, and 90 to 99.9 mol % of the TFE unit and the HFP unit in total. If the amount of the copolymerizable monomer unit is less than 0.1 mol %, the moldability, environmental-stress-cracking resistance, and stress cracking resistance tend to deteriorate. If the amount is more than 10 mol %, the low chemical permeability, heat resistance, mechanical properties, and productivity tend to deteriorate.

PFA

PFA is preferable from the viewpoints of excellent heat resistance and excellent fuel barrier properties of the fluororubber molded article. PFA is not particularly limited, and is preferably a copolymer of 70 to 99 mol % of the TFE unit and 1 to 30 mol % of the PAVE unit, and more preferably a copolymer of 80 to 97 mol % of the TFE unit and 3 to 20 mol % of the PAVE unit. If the amount of the TFE unit is less than 70 mol %, the mechanical properties tend to decrease. If the amount is more than 99 mol %, the melting point is too high and thus the moldability tends to decrease.

The PAVE is preferably at least one selected from the group consisting of perfluoro(methyl vinyl ether) [PMVE], perfluoro(ethyl vinyl ether) [PEVE], perfluoro(propyl vinyl ether) [PPVE], and perfluoro(butyl vinyl ether), more preferably at least one selected from the group consisting of PMVE, PEVE, and PPVE, and still more preferably PMVE.

PFA may be a copolymer of TFE, PAVE, and a monomer copolymerizable with TFE and PAVE. Examples of the monomer include HFP, vinyl monomers represented by $CX^5X^6=CX^7(CF_2)_nX^8$ (wherein $X^5, X^6$ and $X^7$ are the same as or different from each other, and each of these is a hydrogen atom or a fluorine atom, $X^8$ represents a hydrogen atom, a fluorine atom, or a chlorine atom, and n represents an integer of 2 to 10), and alkyl perfluorovinyl ether derivatives represented by $CF_2=CF-OCH_2-Rf^7$ (wherein $Rf^7$ represents a C1 to C5 perfluoroalkyl group).

The alkyl perfluorovinyl ether derivative is preferably one in which $Rf^7$ is a C1 to C3 perfluoroalkyl group, and more preferably $CF_2=CF-OCH_2-CF_2CF_3$.

PFA preferably has 0.1 to 10 mol % of the monomer unit derived from a monomer copolymerizable with TFE and PAVE, and 90 to 99.9 mol % of the TFE unit and the PAVE unit in total. If the amount of the copolymerizable monomer unit is less than 0.1 mol %, the moldability, environmental-stress-cracking resistance, and stress cracking resistance tend to deteriorate. If the amount is more than 10 mol %, the low chemical permeability, heat resistance, mechanical properties, and productivity tend to deteriorate.

CTFE/TFE Copolymer

The CTFE/TFE copolymer preferably has a molar ratio of the CTFE unit to the TFE unit CTFE:TFE of 2:98 to 98:2, and more preferably 5:95 to 90:10. If the amount of the CTFE unit is less than 2 mol %, the chemical permeability tends to decrease and melt processing tends to be difficult. If the amount of the CTFE unit is more than 98 mol %, heat resistance and chemical resistance in molding may decrease.

The CTFE/TFE copolymer may be a copolymer of CTFE, TFE, and a monomer copolymerizable with CTFE and TFE. Examples thereof include ethylene, VdF, HFP, perfluoro (alkyl vinyl ether) [PAVE] represented by $CF_2=CF-OR_f^6$ (wherein $R_f^6$ represents a C1 to C5 perfluoroalkyl group), vinyl monomers represented by $CX^5X^6=CX^7(CF_2)_nX^8$ (wherein $X^5$, $X^6$, and $X^7$ are the same as or different from each other and each of these is a hydrogen atom or a fluorine atom, $X^8$ represents a hydrogen atom, a fluorine atom, or a chlorine atom, and n represents an integer of 2 to 10), and alkyl perfluorovinyl ether derivatives represented by $CF_2=CF-OCH_2-Rf^7$ (wherein $Rf^7$ represents a C1 to C5 perfluoroalkyl group). Among these, PAVE is preferable.

The PAVE is preferably at least one selected from the group consisting of perfluoro(methyl vinyl ether) [PMVE], perfluoro(ethyl vinyl ether) [PEVE], perfluoro(propyl vinyl ether) [PPVE], and perfluoro(butyl vinyl ether). Among these, at least one selected from the group consisting of PMVE, PEVE, and PPVE is more preferable.

The alkyl perfluoro vinyl ether derivative is preferably one wherein $Rf^7$ is a C1 to C3 perfluoroalkyl group, and more preferably $CF_2=CF-OCH_2-CF_2CF_3$.

The CTFE/TFE copolymer preferably has 0.1 to 10 mol % of the monomer unit derived from a monomer copolymerizable with CTFE and TFE, and 90 to 99.9 mol % of the CTFE unit and the TFE unit in total. If the amount of the copolymerizable monomer unit is less than 0.1 mol %, the moldability, environmental-stress-cracking resistance, and stress cracking resistance tend to deteriorate. If the amount is more than 10 mol %, the low chemical permeability, heat resistance, mechanical properties, and productivity tend to deteriorate.

The fluororesin (B) preferably has a melting point of 120° C. to 340° C., more preferably 150° C. to 330° C., and still more preferably 170° C. to 320° C. If the melting point of the fluororesin (B) is lower than 120° C., bleed out tends to occur in cross-linking and molding. If the melting point is more than 340° C., mixing of the fluororesin (B) with the fluororubber (A) tends to be difficult.

The fluororesin (B) preferably has a melt flow rate [MFR] of 0.1 to 100 g/10 min. Too low an MFR may cause inferior abrasion resistance, and too high an MFR may cause difficulties in molding.

To increase the compatibility between the fluororesin (B) and the fluororubber (A), at least one polyfunctional compound may be added. A polyfunctional compound is a compound having at least two functional groups which are structurally the same as or different from each other in one molecule.

Each of the functional groups in the polyfunctional compound may be any functional group generally known to have reactivity, such as carbonyl, carboxyl, haloformyl, amide, olefin, amino, isocyanate, hydroxy, and epoxy. A compound having these functional groups not only has high compatibility with the fluororubber (A) but also is reactive to functional groups known to have reactivity in the fluororesin (B), and is therefore expected to further increase the compatibility.

The fluororubber (A) preferably constitute 45 to 97% by mass of the composition. Too small an amount of the fluororubber may not lead to a fluororubber molded article having characteristics as a rubber, while too large an amount of the fluororubber may not lead to a fluororubber product having low friction properties.

The cross-linkable fluororubber composition of the present invention preferably has a mass ratio (A)/(B) of the fluororubber (A) to the fluororesin (B) of 60/40 to 97/3. Too small an amount of the fluororesin (B) may lead to an insufficient effect of reducing the coefficient of friction, while too large an amount of the fluororesin (B) may notably deteriorate the rubber elasticity, which may lead to loss of flexibility. From the viewpoint of good flexibility and good low frictional properties, the ratio (A)/(B) is more preferably 65/35 to 95/5, and still more preferably 70/30 to 90/10.

If necessary, the cross-linkable fluororubber composition of the present invention may further contain common formulation ingredients including additives for fluororubber such as fillers, processing aids, plasticizers, colorants, stabilizers, bonding aids, release agents, electric conductivity imparting agents, thermal conductivity imparting agents, surface non-adhesive agents, flexibility imparting agents, heat resistance improvers, and flame retardants, to the extent that the effects of the present invention are not deteriorated.

The cross-linkable fluororubber composition of the present invention does not contain a fluorine-containing thermoplastic elastomer.

The method for producing the fluororubber molded article of the present invention will be described below.

The method for producing the fluororubber molded article of the present invention includes (I) a step of obtaining a cross-linkable fluororubber composition by co-coagulating the fluororubber (A) and the fluororesin (B);

(II) a molding and cross-linking step of obtaining a cross-linked molded article by molding and cross-linking the cross-linkable fluororubber composition; and (III) a heat-treatment step of obtaining a fluororubber molded article by heating the cross-linked molded article at a temperature not lower than a melting point of the fluororesin (B).

Hereinafter, the respective steps are described.

Step (I)

This step is for obtaining a cross-linkable fluororubber composition by co-coagulating the fluororubber (A) and the fluororesin (B).

Examples of the method of co-coagulation include (i) performing coagulation after mixing an aqueous dispersion of the fluororubber (A) and an aqueous dispersion of the fluororesin (B);

(ii) performing coagulation after adding the powder of the fluororubber (A) to the fluororesin (B); and (iii) performing coagulation after adding the powder of the fluororesin (B) to an aqueous dispersion of the fluororubber (A).

The method for the co-coagulation is preferably the method (i) particularly from the viewpoint of easy uniform dispersion of the respective resins.

The coagulation by the above coagulation methods (i) to (iii) can be performed using a coagulant, for example. Such a coagulant is not particularly limited, and examples thereof include known coagulants such as aluminum salts (e.g. aluminum sulfate, alum), calcium salts (e.g. calcium sulfate), magnesium salts (e.g. magnesium sulfate), and monovalent cation salts (e.g. sodium chloride, potassium chloride). In the case of performing coagulation using a coagulant, an acid or an alkali may be added to adjust the pH for promotion of the coagulation.

Since a cross-linking agent is required depending on the cross-linking system of the fluororubber, the step (I) may also preferably be a step of co-coagulating the fluororubber (A) and the fluororesin (B) to obtain co-coagulation powder, and thereafter mixing the co-coagulation powder and a cross-linking agent to obtain a cross-linkable fluororubber composition.

The mixing of the co-coagulation powder and a cross-linking agent can be performed by a conventionally known method. For example, the mixing may be performed using an open roll under temperature and time conditions which allow the co-coagulation powder and the cross-linking agent to be sufficiently mixed.

Molding and Cross-Linking Step (II)

This step is a step of producing a cross-linked molded article by molding and cross-linking the cross-linkable fluororubber composition obtained in the mixing step (I). The order of molding and cross-linking is not limited; that is, cross-linking may be performed after molding, molding may be performed after cross-linking, or molding and cross-linking may be performed at the same time.

In the case of a hose or a long plate, for example, a method of performing extrusion-molding and then cross-linking is appropriately employed. In the case of products having other shapes, a method can be employed in which block-shaped cross-linked product is first obtained and then the product is subjected to molding processes such as cutting. In the case of comparatively simple molded articles such as piston rings and oil seals, a method of performing molding and cross-linking with a mold at the same time is also commonly employed.

Examples of the molding method include, but not limited to, extrusion-molding, pressure-molding using a mold, and injection-molding.

The cross-linking method may also be steam cross-linking, pressure-molding, irradiation cross-linking, and a common method in which the cross-linking reaction is initiated by heating. In the present invention, the cross-linking reaction initiated by heating is suitable from the viewpoint of smooth migration of the fluororesin to the surface layer of the cross-linkable fluororubber composition.

The method for molding and cross-linking a cross-linkable fluororubber composition and the conditions thereof may be within the scope of known methods and conditions of the molding and cross-linking.

The non-limiting specific cross-linking conditions may be appropriately determined usually from a temperature range of 150° C. to 300° C. and a cross-linking time of 1 minute to 24 hours, according to the kind of the cross-linking agent and the like to be used.

The cross-linking of rubber sometimes includes a post treatment step called secondary cross-linking after the first cross-linking treatment (called primary cross-linking). The conventional secondary cross-linking, as described in the heat-treatment step (III) below, is a treatment step different from the molding and cross-linking step (II) and heat-treatment step (III) in the present invention.

Heat-Treatment Step (III)

In this step, the cross-linked molded article obtained in the molding and cross-linking step (II) is heated to a temperature higher than the melting point of the fluororesin (B) so as to obtain a fluororubber molded article.

The heat-treatment step (III) in the present invention is a treatment step for increasing the proportion of the fluororesin on the cross-linked molded article surface. To increase the proportion, the heating temperature is employed which is not lower than the melting point of the fluororesin (B) and is lower than the pyrolysis temperatures of the fluororubber (A) and the fluororesin (B).

If the heating temperature is lower than the melting point, the fluororesin proportion on the cross-linkable molded product surface does not increase sufficiently. In order to avoid the pyrolysis of the fluororubber and the fluororesin, the heating temperature must be lower than the lower of the pyrolysis temperatures of the fluororubber (A) and the fluororesin (B). The heating temperature is preferably higher than the melting point of the fluororesin by 5° C. or more from the viewpoint of easy reduction of the friction in a short time.

The above upper limit of the temperature is for common fluororubbers. The upper limit of the temperature is not limited thereto for fluororubbers having super heat resistance because the upper limit of the temperature in this case is the pyrolysis temperature of the fluororubber having super heat resistance.

In the heat-treatment step (III), the heating temperature is closely related to heating time, and the heating time is preferably comparatively long at temperatures comparatively close to the lower limit of the temperature, and is preferably comparatively short at temperatures comparatively close to the upper limit of the temperature. As above, the heating time may be appropriately set depending on the relation with the heating temperature, and is substantially up to 48 hours except for the case of using a highly heat-resistant fluororubber because very long heating treatment sometimes causes heat deterioration of the fluororubber. Usually, the heat-treatment time is preferably 1 minute to 48 hours, and more preferably 1 minute to 24 hours from the viewpoint of good productivity, but is preferably 24 hours to 48 hours in order to sufficiently decrease the coefficient of friction.

The present inventors are the first to find the phenomenon of the increase in the proportion of the fluororesin in the surface region of the cross-linked molded article in the heat-treatment step (III).

The secondary cross-linking conventionally performed is a treatment of completely decomposing the cross-linking agent remaining after the end of the primary cross-linking so as to complete cross-linking of the fluororubber, thereby increasing the mechanical properties and compression set characteristics of the cross-linked molded article.

Accordingly, in the conventional secondary cross-linking conditions, coexistence of the fluororesin (B) is not expected. Even if the above cross-linking conditions incidentally overlap the heating conditions in the heat-treatment step in the present invention, the heating conditions are set within the scope of the purpose of completing cross-linking of the fluororubber (completing decomposition of the cross-linking agent) without consideration of the existence of the fluororesin as a factor in setting of the cross-linking conditions. Hence, the heating under the above conditions do not lead to the condition of heat-softening or fusing the fluororesin (B) added in the cross-linked rubber product (not uncross-linked rubber product).

The secondary cross-linking for completing the cross-linking of the fluororubber (A) (completely decomposing the cross-linking agent) may be performed in the molding and cross-linking step (II) in the present invention.

The remaining cross-linking agent may be decomposed and thus cross-linking of the fluororubber (A) may be completed in the heat-treatment step (III); still, this cross-linking of the fluororubber (A) in the heat-treatment step (III) is merely a secondary effect.

The production method of the present invention enables to obtain a fluororubber molded article having significantly better characteristics of the fluororesin, such as low friction properties, non-adhesiveness, water repellency, and oil repellency, than ones which are not heat-treated. The fluororubber molded article produced by the production method of the present invention actually will also have the characteristics of the fluororubber at portions other than the surface region, and have, overall, low friction properties, non-adhesiveness, water repellency, oil repellency, and elastomeric properties in a balanced manner. Further, the fluororubber molded article does not have definite interface between the fluororesin and the fluororubber, and therefore the region rich in the fluororesin on the surface does not come off or peel off. Hence, the fluororubber molded article has higher durability than conventional fluororubber molded articles having fluororesin applied or adhered to the fluororubber surface.

The fluororubber molded article of the present invention is useful as a product such as a sealing material, a slide member, and a non-adhesive member, owing to the low friction properties, non-adhesiveness, water repellency and oil repellency (high contact angle).

Examples thereof include, but not limited to, the following molded articles.

Sealing Material:

In the fields relating to semiconductor production such as semiconductor producing devices, liquid crystal panel producing devices, plasma panel producing devices, plasma-addressed liquid crystal panels, field emission display panels, and solar battery substrates, examples of the sealing material include O(square)-rings, packings, gaskets, diaphragms, and other various sealing materials. These sealing materials can be used for CVD devices, dry etching devices, wet etching devices, oxidation diffusion devices, sputtering devices, ashing devices, washing devices, ion implanting devices, and gas discharging devices. Specific examples of the sealing material include O-rings for gate valves, O-rings for quartz windows, O-rings for chambers, O-rings for gates, O-rings for bell jars, O-rings for couplings, O-rings and diaphragms for pumps, O-rings for semiconductor gas control devices, O-rings for resist developers and peeling liquids, and other various sealing materials.

In the field of automobiles, the fluororubber molded article can be used as sealing materials such as gaskets, shaft seals, valve stem seals, or other various sealing materials for engines and the peripheral devices thereof, or various sealing materials for automatic transmissions. Examples of the sealing material for fuel systems and the peripheral devices thereof include O(square)-rings, packings, and diaphragms. Specific examples thereof include engine head gaskets, metal gaskets, oil pan gaskets, crankshaft seals, cam shaft seals, valve stem seals, manifold packings, seals for oxygen sensors, injector O-rings, injector packings, fuel pump O-rings and diaphragms, crankshaft seals, gear box seals, power piston packings, cylinder liner seals, valve stem seals, automatic transmission front pump seals, rear axle pinion seals, universal joint gaskets, speed meter pinion seals, foot brake piston cups, torque transmission O-rings, oil seals, exhaust gas recirculation system seals, bearing seals, carburetor sensor diaphragms and the like.

In the airplane, rocket and shipbuilding fields, examples of the sealing material include diaphragms, O (square)-rings, valves, packings, and other various sealing materials, and these can be used in fuel systems. Specifically, in the airplane field, the molded articles are used as jet engine valve stem seals, gaskets and O-rings, rotating shaft seals, hydraulic gaskets and fire wall seals and the like; in the shipbuilding field, the molded articles are used as screw propeller shaft stern seals, diesel engine suction and exhaust valve stem seals, butterfly valve seals, butterfly valve shaft seals and the like.

Examples of the sealing materials in the chemical plant field include valves, packings, diaphragms, O (square)-rings, and other various sealing materials, and these can be used in various steps of producing chemicals such as medicinal chemicals, agrochemicals, paints and resins. More specifically, the molded articles can be used as seals in chemical pumps, flowmeters and piping systems, heat exchanger seals, glass cooler packings in sulfuric acid production plants, seals in agrochemical spreaders and agrochemical transfer pumps, gas piping seals, plating bath seals, high-temperature vacuum drier packings, papermaking belt roller seals, fuel cell seals, wind tunnel joint seals, tube joining part packings in gas chromatographs and pH meters, and seals, diaphragms and valve parts in analytical apparatus and physical and chemical apparatus.

In the photographic field (e.g. developing machines), the printing field (e.g. printing machines) and the painting field (e.g. painting equipment), the molded articles can be used for example as seals and valve parts in dry-process copying machines.

In the food industry plant equipment field, examples of the sealing material include valves, packings, diaphragms, O (square)-rings and various sealing materials, and these can be used in food production steps. More specifically, the molded articles can be used as plate type heat exchanger seals, and vending machine electromagnetic valve seals.

In the nuclear power plant equipment field, examples of the sealing material include packings, O-rings, diaphragms, valves, and various seal members.

In the general industry field, examples of the sealing material include packings, O-rings, diaphragms, valves, and various seal members. More specifically, the molded articles are used as seals and bearing seals in hydraulic and lubricating systems, windows and other seals in dry cleaning equipment, uranium hexafluoride enrichment apparatus seals, seal (vacuum) valves in cyclotrons, automatic packaging machine seals, diaphragms in pumps (in pollution-monitoring apparatus) for analyzing sulfurous acid gas and chlorine gas in air, and the like.

In the electric system field, the molded articles are specifically used as bullet train (Shinkansen) insulating oil caps, liquid-sealed transformer benching seals and the like.

In the fuel cell field, the articles are specifically used as seal materials between electrodes and a separator and as seals in hydrogen, oxygen or product water piping systems.

In the electronic component field, the articles are specifically used as radiator materials, electromagnetic wave shield materials, computer hard disk drive gaskets and the like.

Those sealing materials which can be used in situ molding are not particularly limited, and examples thereof include engine oil pan gaskets, gaskets for magnetic recording apparatus, and clean room filter unit sealing materials.

The molded articles can be particularly suitably used as gaskets for magnetic recording apparatus (hard disk drives) and sealing materials for clean equipment such as sealing materials in semiconductor manufacturing apparatus or storehouses for wafers or other devices.

Further, the molded articles are particularly suitably used as sealing materials for fuel cells, such as packings used between fuel cell electrodes or in peripheral piping systems.

Sliding Members:

In the automobile-related fields, examples of the sealing materials include piston rings, shaft seals, valve stem seals, crankshaft seals, cam shaft seals, and oil seals.

Generally, the examples include fluororubber products used as parts that slide in contact with other materials.
Non-Adhesive Members:

Examples of the sealing material in the computer field include hard disk crash stoppers.

Fields utilizing water repellency and oil repellency: Examples of the sealing material include automobile wiper blades, and coated fabrics for outdoor tents.

EXAMPLES

The following examples illustrate the present invention more specifically. These examples are, however, by no means limitative of the scope of the present invention.

The physical characteristics reported herein were measured by the following methods.

(1) Cross-Linking (Vulcanization) Characteristics

The minimum torque (ML), the maximum torque (MH), the induction time (T10), and the optimum vulcanization time (T90) were measured with a Curelastometer Type II (product of JSR Corporation).

(2) 100% Modulus (M100)

The measurement was performed in accordance with JIS K6251.

(3) Tensile Strength at Break (Tb)

The measurement was performed in accordance with JIS K6251.

(4) Elongation at Break (Eb)

The measurement was performed in accordance with JIS K6251.

(5) Hardness (Shore A)

The measurement was performed with Durometer Type A in accordance with JIS K6253 (peak value).

(6) Coefficient of Friction

The measurement was performed with Friction Player FPR2000 (product of Rhesca Corporation) under the conditions of a weight of 20 g, rotation mode, the number of rotations of 60 rpm, and the radius of rotation of 10 mm. In a stabilized state five minutes or longer after the rotation, the coefficient of friction was read and the value was taken as the coefficient of dynamic friction.

The used materials mentioned in the tables and herein are the ones listed below.
Fluororubber (A)

VdF/HFP/TFE/cyano group-containing monomer=50/30/19/1 (mol %) copolymer $ML_{1+10}$(121° C.)=88
Fluororesin (B)

Neoflon FEP dispersion produced by Daikin Industries, Ltd. (Trade name: ND-1, MFR: 1.7 g/10 min, melting point: about 240° C.)
Filler Carbon black (MT carbon produced by Cancarb: N990)
Ammonia-Producing Compound Urea (product of Kishida Chemical Co., Ltd., reagent chemical)

Example 1

Step (I)

A dispersion (polymer content: 24% by mass) of the fluororubber (A) and a dispersion (polymer content: 32% by mass) of the fluororesin (B) were mixed such that the solids content ratio of the fluororubber (A) to the fluororesin (B) was 70:30. The resulting mixture was named dispersion D.

Next, 400 g of the dispersion D was added to 500 g of pure water. The mixture was further mixed with 2 g of aluminum sulfate while being stirred with a mixer. The mixture was stirred for about three minutes and the solids content was removed.

The solids content was dried at 80° C. in an oven for 20 hours. The resulting product is a co-coagulum.

The obtained co-coagulum was placed around two 8-inch rolls in an open roll, and 14 parts by mass of the filler and 0.3 parts by mass of the ammonia-producing compound were added to 100 parts by mass of the co-coagulum. The obtained mixture was kneaded for 20 minutes. The mixture was then cooled for 24 hours, and kneaded again at 30° C. to 80° C. for 20 minutes using the open roll provided with two 8-inch rolls, and thereby a full compound (cross-linkable fluororubber composition) was prepared.

The cross-linking (vulcanization) characteristics of the full compound were determined. Table 1 shows the results.
Molding and Cross-Linking Step (II)
(Molding Step)

The obtained full compound was molded with an 8-inch open roll into an un-cross-linked fluororubber sheet which eventually had a thickness of 3 mm.
(Cross-Linking Step)

The un-cross-linked fluororubber sheet was press-cross-linked with a mold at 180° C. for 15 minutes, and thereby a cross-linked fluororubber sheet having a thickness of 2 mm was obtained.

The 100% modulus (M100), tensile strength at break (Tb), elongation at break (Eb), hardness (Shore A, peak value), and coefficient of friction of the obtained cross-linked fluororubber sheet were measured. Table 2 shows the results.
Heat-Treatment Step (III)

The cross-linked fluororubber sheets (melting point of fluororesin B contained: 240° C.) were put into respective furnaces maintained at 230° C. and 250° C. for 24 hours or 48 hours for heat-treatment.

The 100% modulus (M100), tensile strength at break (Tb), elongation at break (Eb), hardness (Shore A, peak value), and coefficient of friction of the heat-treated cross-linked fluororubber sheets (230° C. heat-treatment and 250° C. heat-treatment) were measured. Table 2 shows the results.

Comparative Example 1

A cross-linked fluororubber sheet was produced through the same molding and cross-linking step as that in Example 1, except that the fluororubber (A) was not co-coagulated with a fluororesin to form a cross-linkable fluororubber composition, the amount of the filler was changed to 20 parts by mass, and the amount of the ammonia-producing compound was changed to 0.4 parts by mass.

The obtained cross-linked fluororubber sheet was placed in a furnace maintained at 250° C. for 48 hours to be heated as in Example 1.

The 100% modulus (M100), tensile strength at break (Tb), elongation at break (Eb), hardness (Shore A, peak value), and coefficient of friction of the obtained cross-linked fluororubber sheet (250° C. heat-treatment) were measured.

Comparative Example 2

A cross-linked fluororubber sheet was produced through the same molding and cross-linking step as that in Example 1, except that the fluororubber (A) and the fluororesin (B) were kneaded at a material temperature of 200° C., the amount of the filler was changed to 20 parts by mass, and the amount of the ammonia-producing compound was changed to 0.3 parts by mass.

The obtained cross-linked fluororubber sheet was placed in a furnace maintained at 250° C. for 48 hours to be heated as in Example 1.

The 100% modulus (M100), tensile strength at break (Tb), elongation at break (Eb), hardness (Shore A, peak value), and coefficient of friction of the obtained cross-linked fluororubber sheet (250° C. heat-treatment) were measured.

Table 1 shows the cross-linking (vulcanization) characteristics of the full compounds, and Table 2 shows the characteristics of the cross-linkable fluororubber sheets.

TABLE 1

|  | Example 1 | Comaprative Example 1 | Comparative Example 2 |
|---|---|---|---|
| Cross-linkable fluororubber composition (parts by mass) |  |  |  |
| Fluororubber A | 70 | 100 | 70 |
| Fluororesin B | 30 | — | 30 |
| Filler | 14 | 20 | 14 |
| Ammonia-producing compound | 0.3 | 0.4 | 0.3 |
| Fluororubber/Fluororesin mixing method | Co-coagulation | — | Kneading at 200° C. |
| Cross-linking (vulcanization) characteristics @ 180° C. |  |  |  |
| Minimum torque ML (N) | 12.7 | 13 | 12.5 |
| Maximum torque MH (N) | 31.4 | 37.9 | 35.5 |
| Induction time T10 (min) | 1.5 | 2.5 | 2.8 |
| Optimum vulcanization time T90 (min) | 8.5 | 9.0 | 9.3 |

The results in Table 1 and Table 2 show that a fluororubber molded article having excellent mechanical strength and low coefficient of friction can be obtained by heat-treating a cross-linkable fluororubber compound (full compound) prepared under the specific conditions at a temperature higher than the melting point of the fluororesin.

INDUSTRIAL APPLICABILITY

The fluororubber molded article of the present invention can be used as a sealing material, a slide member, and a non-adhesive member.

The invention claimed is:

1. A fluororubber molded article obtained by cross-linking a cross-linkable fluororubber composition comprising a coagulum obtained by co-coagulating a fluororubber (A) and a fluororesin (B), and heat-treating the cross-linked fluororubber composition at a temperature higher than a melting point of the fluororesin (B) by 5° C. or more for 1 minute to 48 hours,
   wherein the fluororubber (A) is a copolymer containing a vinylidene fluoride unit,
   the fluororesin (B) is tetrafluoroethylene/hexafluoropropylene copolymer, and
   a mass ratio (A)/(B) of the fluororubber (A) to the fluororesin (B) is 60/40 to 97/3.

2. The fluororubber molded article according to claim 1, wherein the fluororubber (A) is at least one selected from the group consisting of vinylidene fluoride/hexafluoropropylene copolymers, vinylidene fluoride/hexafluoropropylene/tetrafluoroethylene copolymers, tetrafluoroethylene/propylene/vinylidene fluoride copolymers, ethylene/hexafluoropropylene/vinylidene fluoride copolymers, vinylidene fluoride/tetrafluoroethylene/perfluoro(alkyl vinyl ether) copolymers, and vinylidene fluoride/chlorotrifluoroethylene copolymers.

TABLE 2

|  | Example 1 | Comparative Example 1 | Comparative Example 2 |
|---|---|---|---|
| Molding and cross-linking conditions |  |  |  |
| Press cross-linking (temperature × time) | 180° C. × 15 min | 180° C. × 15 min | 180° C. × 15 min |
| Heat treatment (temperature ° C. × time) | None | None | None |
| M100 (Mpa) | 7.3 |  | 4.4 |
| Tb (Mpa) | 9.5 |  | 5.8 |
| Eb (%) | 240 |  | 170 |
| Hardness (Shore A) | 87 |  | 85 |
| Coefficient of friction | 0.75 |  | 1.46 |
| Heat treatment (temperature ° C. × time) | 230° C. × 24 hrs | 230° C. × 24 hrs | 230° C. × 24 hrs |
| M100 (Mpa) | 5.4 |  |  |
| Tb (Mpa) | 11.9 |  |  |
| Eb (%) | 220 |  |  |
| Hardness (Shore A) | 85 |  |  |
| Coefficient of friction | 0.76 |  |  |
| Heat treatment (temperature ° C. × time) | 250° C. × 24 hrs | 250° C. × 24 hrs | 250° C. × 24 hrs |
| M100 (Mpa) | 5 |  |  |
| Tb (Mpa) | 13.4 |  |  |
| Eb (%) | 230 |  |  |
| Hardness (Shore A) | 85 |  |  |
| Coefficient of friction | 0.78 |  |  |
| Heat treatment (temperature ° C. × time) | 250° C. × 48 hrs | 250° C. × 48 hrs | 250° C. × 48 hrs |
| M100 (Mpa) | 5.1 | 5.7 | 4.9 |
| Tb (Mpa) | 13.3 | 16.6 | 8.6 |
| Eb (%) | 220 | 190 | 180 |
| Hardness (Shore A) | 85 | 76 | 84 |
| Coefficient of friction | 0.48 | 1.11 | N/A |

3. The fluororubber article according to claim 1,
wherein the fluororubber (A) includes a copolymerization unit derived from a cross-linking-site-imparting monomer.

4. A method for producing a fluororubber molded article, comprising (I) a step of obtaining a cross-linkable fluororubber composition comprising a coagulum obtained by co-coagulating a fluororubber (A) and a fluororesin (B) by co-coagulating the fluororubber (A) and the fluororesin (B), wherein the fluororubber (A) is a copolymer containing a vinylidene fluoride unit, the fluororesin (B) is tetrafluoroethylene/hexafluoropropylene copolymer, and a mass ratio (A)/(B) of the fluororubber (A) to the fluororesin (B) is 60/40 to 97/3;

(II) a molding and cross-linking step of obtaining a cross-linked molded article by molding and cross-linking the cross-linkable fluororubber composition; and (III) a heat-treatment step of obtaining a fluororubber molded article by heating the cross-linked molded article at a temperature higher than a melting point of the fluororesin (B) by 5° C. or more for 1 minute to 48 hours.

5. The fluororubber molded article according to claim 1, wherein the fluororubber molded article is a sealing material.

6. The fluororubber molded article according to claim 1, wherein the fluororubber molded article is a slide member.

7. The fluororubber molded article according to claim 1, wherein the fluororubber molded article is a non-adhesive member.

8. The fluororubber molded article according to claim 1, having water repellency and oil repellency on a surface.

* * * * *